UNITED STATES PATENT OFFICE.

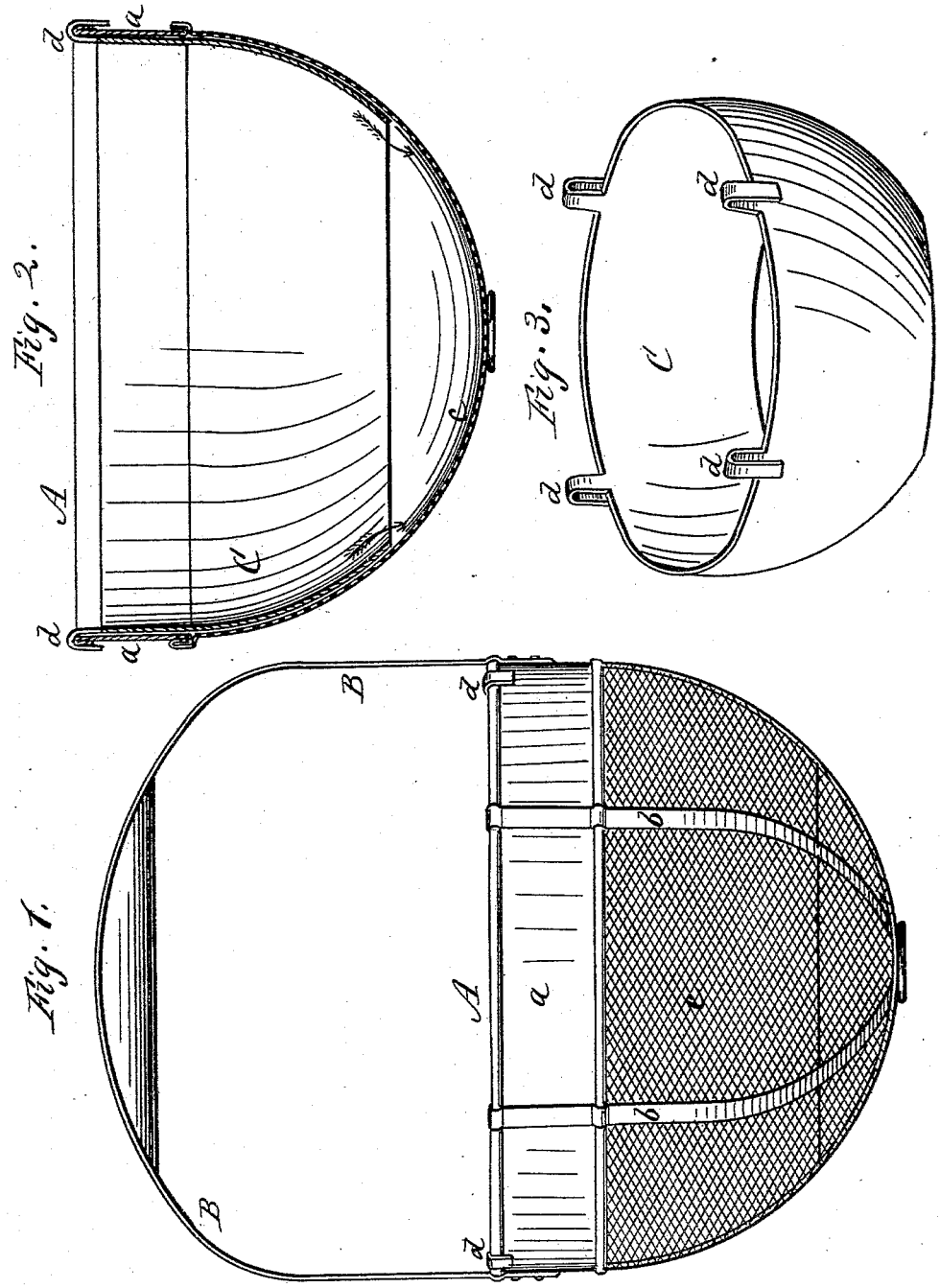

GEORGE B. TITUS, OF IRONDEQUOIT, NEW YORK.

POISONOUS-POWDER DUSTER.

SPECIFICATION forming part of Letters Patent No. 401,313, dated April 9, 1889.

Application filed August 9, 1888. Serial No. 282,388. (No model.)

*To all whom it may concern:*

Be it known that I, GEORGE B. TITUS, of Irondequoit, in the county of Monroe and State of New York, have invented a certain new and useful Improvement in Devices for Sifting Poisonous Powders for Destroying Insects on Plants; and I do hereby declare that the following is a full, clear, and exact description of the same, reference being had to the drawings accompanying this application.

My improvement relates to devices for sifting paris-green and other poisonous powders on plants for the purpose of destroying insects; and it consists of a wire-screen receptacle of convex or half-globular form and the combination therewith of a removable shield constructed, arranged, and operating as hereinafter more fully described.

In the drawings, Figure 1 is a side elevation of the device. Fig. 2 is a central vertical section of the body portion. Fig. 3 is a perspective view of the removable shield.

A indicates the body of the device, which consists of an upper rim or hoop, $a$, diagonal braces $b\,b$, and a wire-screen bulb, $c$, the whole forming a receptacle for holding the material of half-globular form, as shown. The screen, which forms the main body of the device, presents inclined sides, so that the tendency of the powder is to work to the bottom. B is the bail or handle riveted or otherwise attached to the rim $a$.

C is a shield made of imperforate sheet metal, struck up in convex form at the sides, but having an open bottom, and provided with hooks $d\,d$ at the top, which hook over the top of the receptacle A when the shield is fitted in the receptacle. When fitted in place, as shown in Fig. 2, the sides of the shield rest closely to the sides of the receptacle and form a continuous covering to the perforated sides of the receptacle down to a point near the bottom, that leaves only a comparatively small extent of the perforated surface open, and that near the apex. The object of this shield is to adapt the sifter to large or small plants, thus saving much of the material, as well as labor. When the plants are young, they are small and occupy but little surface, and by applying the shield the powder is discharged only near the apex to cover this surface; but when the plants are large, covering much surface, the shield is removed, giving the full sifting capacity. In ordinary use the powder—such as paris-green—is mixed with plaster or some other diluting agent.

Having described my invention, I do not claim a hinged receptacle with an inclosed sifter, such as shown in Patent No. 281,364; but

What I claim as new, and desire to secure by Letters Patent, is—

The combination, with the dish-shaped perforated receptacle A, provided with the handle B, of the removable shield C, constructed with imperforate sides and an open bottom, and provided with hooks $d\,d$, by which it is suspended and held in the receptacle, as herein set forth.

In witness whereof I have hereunto signed my name in the presence of two subscribing witnesses.

GEORGE B. TITUS.

Witnesses:
 Z. L. DAVIS,
 R. F. OSGOOD.